United States Patent [19]

Martin, Jr.

[11] 4,421,472
[45] Dec. 20, 1983

[54] CLAMP FOR BLOW MOLDING MACHINE

[75] Inventor: Merritt W. Martin, Jr., Saline, Mich.

[73] Assignee: R & B Machine Tool Company, Saline, Mich.

[21] Appl. No.: 297,589

[22] Filed: Aug. 31, 1981

[51] Int. Cl.³ .................. B29C 17/07; B29C 17/12
[52] U.S. Cl. .................... 425/527; 264/536; 264/542; 425/531; 425/532; 425/534; 425/541; 425/450.1; 425/451; 425/806
[58] Field of Search ............ 425/527, 531, 532, 534, 425/541, 450.1, 451, 806 R, 806 A; 264/536, 542

[56] References Cited

U.S. PATENT DOCUMENTS

| | | | |
|---|---|---|---|
| 3,081,489 | 3/1963 | Jackson et al. | 425/531 |
| 3,583,031 | 6/1971 | Kader et al. | 425/534 X |
| 3,807,929 | 4/1974 | Moore | 425/541 |
| 3,820,932 | 6/1974 | Worthington | 425/DIG. 806 A X |
| 4,124,668 | 11/1978 | Frohn | 425/527 X |
| 4,233,021 | 11/1980 | Spurr | 425/534 X |
| 4,248,582 | 2/1981 | Martin, Jr. | 425/531 |

FOREIGN PATENT DOCUMENTS

| | | | |
|---|---|---|---|
| 1933075 | 5/1971 | Fed. Rep. of Germany | 264/536 |
| 598474 | 10/1959 | Italy | 425/541 |
| 652960 | 2/1963 | Italy | 425/522 |

Primary Examiner—Jan H. Silbaugh
Attorney, Agent, or Firm—Reising, Ethington, Barnard, Perry & Milton

[57] ABSTRACT

A blow molding machine is disclosed for hollow plastic articles. The machine includes a clamp mechanism for a pair of mold sections. It comprises a body disposed below an extruder at an extruding station and a blow pin at a blow station and carrying opposed platens for supporting the mold sections. Each of a pair of levers is pivotally coupled with a respective platen and with the body and the levers are connected together by a pull bar. An actuating means displaces one of the platens relative to the body and equal and opposite motion is transmitted through the levers and the pull bar to the other platen for opening and closing the clamp. A lifting mechanism supports the clamp for movement between the extruding station and the blow station. The lifting mechanism is adapted for vertical motion by a hydraulic motor acting on a lifting frame. The frame is mounted by pivot links on the machine base and pairs of links are connected by a shaft with a crank arm, the crank arms being connected together by a tie rod. The flash is removed from the formed article by power actuated punching means. A first punch is carried on a transfer mechanism for transferring the article from the blow station to a receiving station and a second punch is located at the receiving station.

10 Claims, 5 Drawing Figures

CLAMP FOR BLOW MOLDING MACHINE

FIELD OF THE INVENTION

This invention relates to blow molding machines and more particularly, it relates to an improved clamp for closing the mold sections and related mechanisms for positioning the mold sections relative to the work stations.

BACKGROUND ART

It is common practice in blow molding of plastic articles to continuously extrude a parison at one work station and to blow mold the parison to form the article at another work station. In such an arrangement, a pair of mold sections are actuated between open and closed positions by a clamp which is movable between the work stations. It is known to mount the clamp on a table which is adapted for limited vertical movement at the work stations or during movement therebetween. Severing means are provided at the extruding station for severing the parison from the extruder. In this arrangement, the mold sections are closed by the clamp at the extruding station; the parison is severed and the table is dropped a short distance to prevent the parison from resticking. The clamp is moved relative to the table to the blow station where a blow pin enters the parison to admit compressed air to expand the parison in the mold sections to form the article. During this operation, the table is raised to its initial level. After the article is formed, the mold sections are opened by the clamp and the clamp is returned to the extruding station and the cycle is repeated. It is also known to mount a pair of trimming members to move with the mold sections so as to remove the flash from the formed article at the blow station when the mold sections are moved to the closed position at the extruding station. A blow molding machine of this type described is disclosed in my U.S. Pat. No. 4,248,582.

A problem in the prior art is that of providing a clamp which is capable of exerting the large closing force required on the mold sections and which affords the desired clearance for movement between the work stations.

Further, there is need for an improved lifting mechanism capable of supporting the clamp and imparting vertical movement thereto with a quick dropping motion.

Another problem in the prior art has been that of trimming the flash from the formed article with simple and reliable trimming equipment.

A general object of this invention is to provide a blow molding machine with particular improvements over the prior art.

SUMMARY OF THE INVENTION

In accordance with this invention, a blow molding machine is provided with an improved clamp which is capable of actuating the mold sections with very high closure forces and good alignment; further, the clamp is adapted to transfer a parison between the extruding station and the blow station in its closed position without interference. This is accomplished by a clamp structure comprising a body disposed below the extruder and the blow pin and carrying opposed platens for supporting the mold sections on the upper side of the body. The clamp comprises a pair of levers, each pivotally coupled with a platen and with the body and also connected together by a pull bar. An actuating means displaces one of the platens relative to the body and equal and opposite motion is transmitted through the levers and the pull bar to the other platen. More specifically, the clamp includes a clamp body with actuating means for moving the first platen along a clamping axis. A first lever has a pivotal coupling with the body and a pivotal coupling with the first platen; a second lever has a pivotal coupling with the body and a pivotal coupling with the second platen. A pull bar has a pivotal coupling with the first and second levers and the pivotal couplings are spaced so that movement of the first platen along the clamping axis imparts equal and opposite movement to the second platen. The first and second platens are slidably mounted on guide means for movement between unclamping and clamping positions corresponding to the opening and closing of the mold sections.

Further, in accordance with this invention, an improved lifting mechanism is provided to support the clamp for movement between the extruding station and the blow station. The lifting mechanism is adapted for vertical motion by means of a hydraulic motor acting on a lifting frame. The frame is mounted for vertical motion by two pairs of pivot links connected between the machine base and the frame. The pivot links in each pair are connected by a shaft which carries a crank arm. The crank arms are connected together by a tie rod so that all of the pivot points on the frame move in unison when the hydraulic motor is actuated.

Further, in accordance with this invention, a blow molding machine is provided with improved means for trimming the flash from the formed article. This is accomplished by power actuated punching means. Preferably, a first pneumatically actuated punch for removing a first flash is carried on a transfer member for transferring the article from the blow station to a receiving station. A second pneumatically actuated punch for removing a second flash is located at the receiving station.

A more complete understanding of this invention may be obtained from the detailed description that follows taken with the accompanying drawings.

BEST MODE FOR CARRYING OUT THE INVENTION

Figure 1:
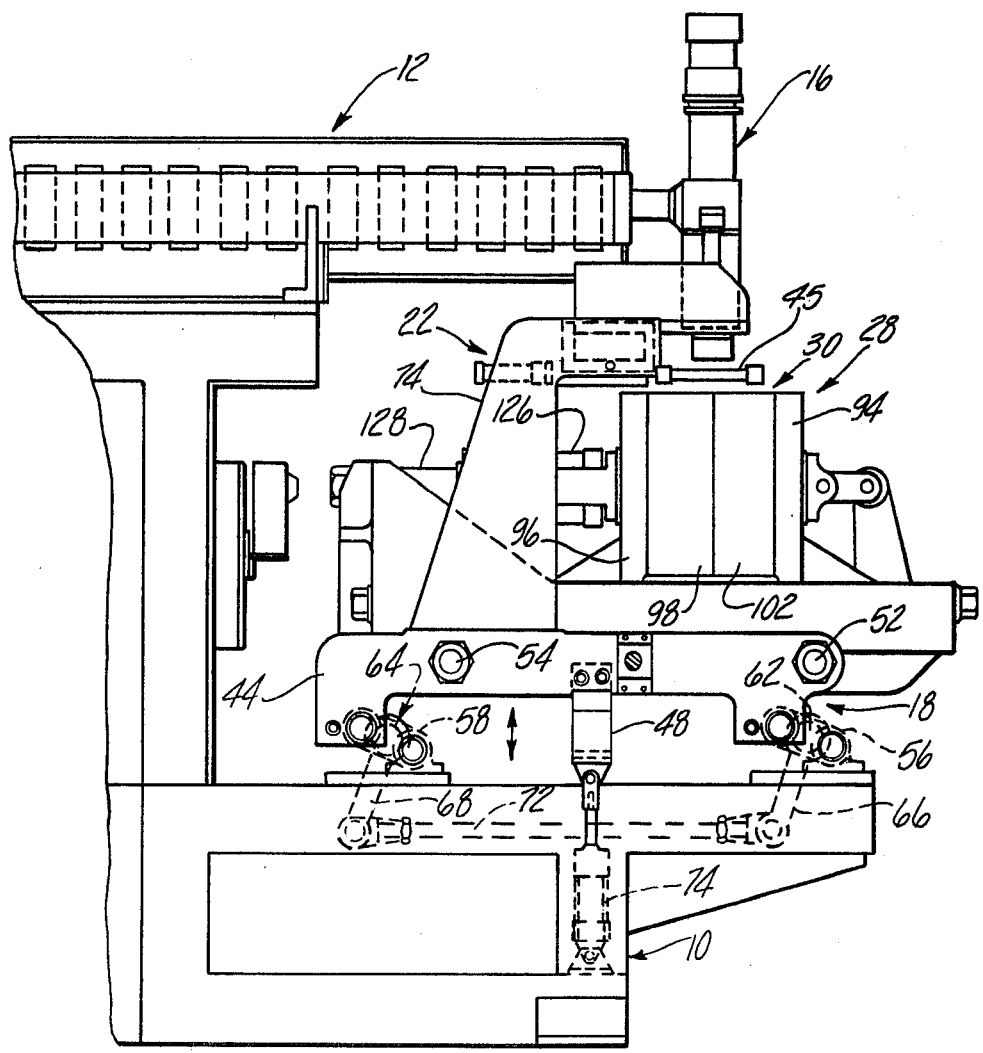
FIG. 1 is a side elevation view of the blow molding machine of this invention.

Referring now to the drawings, there is shown an illustrative embodiment of the invention in a blow molding machine of the continuous extrusion type. In this embodiment, the clamp carries two pairs of mold sections coacting respectively with a pair of extrusion nozzles and a pair of blow pins for making two articles during each cycle. Further, in this embodiment, the blow molded article is a bottle having a carrying handle and a threaded neck for receiving a screw cap. It will be appreciated, as the description proceeds, that the invention is applicable to other blow molding machines for making a wide variety of blow molded plastic articles.

The blow molding machine comprises, in general, a machine base 10 which supports an extruder 12 in fixed position. The extruder 12 comprises first and second extruding heads 14 and 16 which define first and second extruding stations. A lifting frame 18 is mounted for limited vertical motion on the base 10 and supports a bridge 22 upon which is mounted first and second blow pins 24 and 26 which define first and second blow stations. A clamp 28 is movably mounted on the frame 18 for moving a mold 30 which is carried thereby between the extruding stations and the blow stations. Also mounted on the frame 18 for vertical movement therewith, is a receiving tray 32 with first and second trimming punches 34 and 36 thereon defining first and second trimming stations. A transfer carrier 38 is mounted on the side of the clamp 28 for transferring molded articles from the blow station to the receiver station for flash removal. The blow molding machine will be described in further detail below.

At the extruding station, each of the extruding heads 14 and 16 is adapted to continuously extrude a tubular parison 42 and 43, respectively, of plastic material. Each of the parisons is adapted to be received within a respective cavity of the mold 30. In order to cut off the end of the extruded parison for forming an article in the mold, a severing means, suitably in the form of a punch knife 45 (see FIG. 1), is mounted on the bridge 22 at the extruder head 16 and a knife 47 (see FIG. 3) is mounted on the bridge at the extruder head 14.

The lifting frame 18 comprises a pair of end plates 44 and 46 which are secured together by a cross beam 48. In order to support the clamp 28, the frame includes guide means in the form of a pair of transfer bars 52 and 54 extending parallel to the cross beam 48. The frame 18 is mounted on the machine base 10 for limited vertical movement by a pair of pivot links 56 which are respectively pivotally connected between the front of end plate 44 and the base 10 and the front end of the end plate 46 to the base 10. Similarly, a pair of pivot links 58 are respectively connected between the rear ends of the side plates 44 and 46. The pivot links 56 are rigidly connected together by a shaft 62 and the pivot links 58 are rigidly connected together by a shaft 64. A crank arm 66 is fixedly mounted on the shaft 62 and a crank arm 68 is fixedly mounted on the shaft 64. The crank arms 66 and 68 are connected together by a tie rod 72 which is pivotally connected with the respective ends of the crank arms. For imparting vertical movement to the frame 18, a pair of hydraulic actuators 74 and 76 are connected between the cross beam 62 and the machine base 10. When the hydraulic actuators are energized, the frame is raised by the vertical force applied to the cross beam. The pair of pivot links 56 and the pair of pivot links 58 is pivoted upwardly by the movement of the end plates 44 and 46. The pair of pivot links 56 move in unison with each other by reason of the shaft 62 and likewise, the pivot links 58 move in unison by reason of the shaft 64. The crank arms 66 and 68 move in unison by reason of the tie rod 72. Accordingly, the four corners of the frame move in unison. When the actuators 74 and 76 are de-energized, rapid downward motion of the frame ensues under the influence of gravity.

The bridge 22 comprises a pair of vertical posts 74 and 76 with a deck plate 78 extending therebetween. The deck plate supports the blow pins 24 and 26 at the blow station. It also supports the knives 44 and 46 at the extruding station. The posts 74 and 76 are mounted, respectively, on the end plates 44 and 46 of the frame. As previously described, the bridge moves with the frame 18 through a limited vertical distance. At the blow stations, the blow pins 24 and 26 are actuated to extend into the respective mold cavities (see FIG. 3) to admit air under pressure for expanding the parisons against the walls of the cavities.

Figure 2:
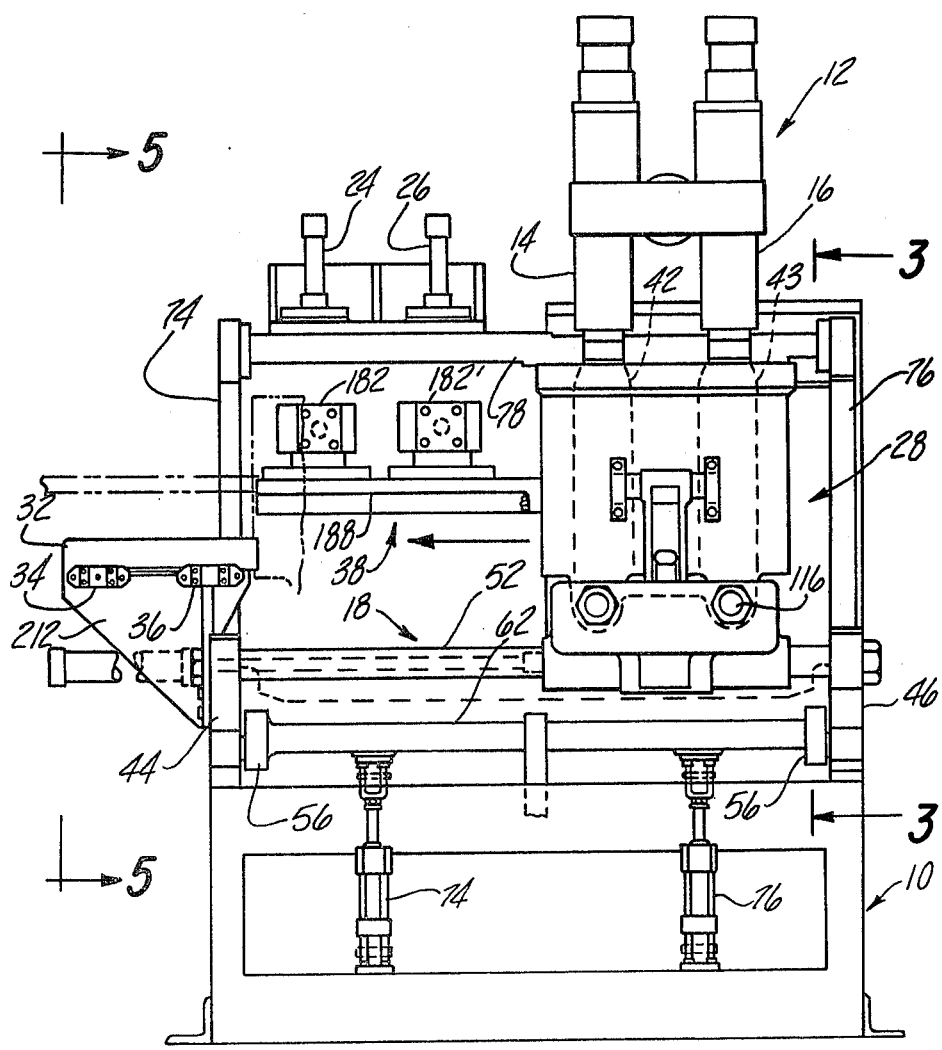
FIG. 2 is a front elevation view.
Figure 3:
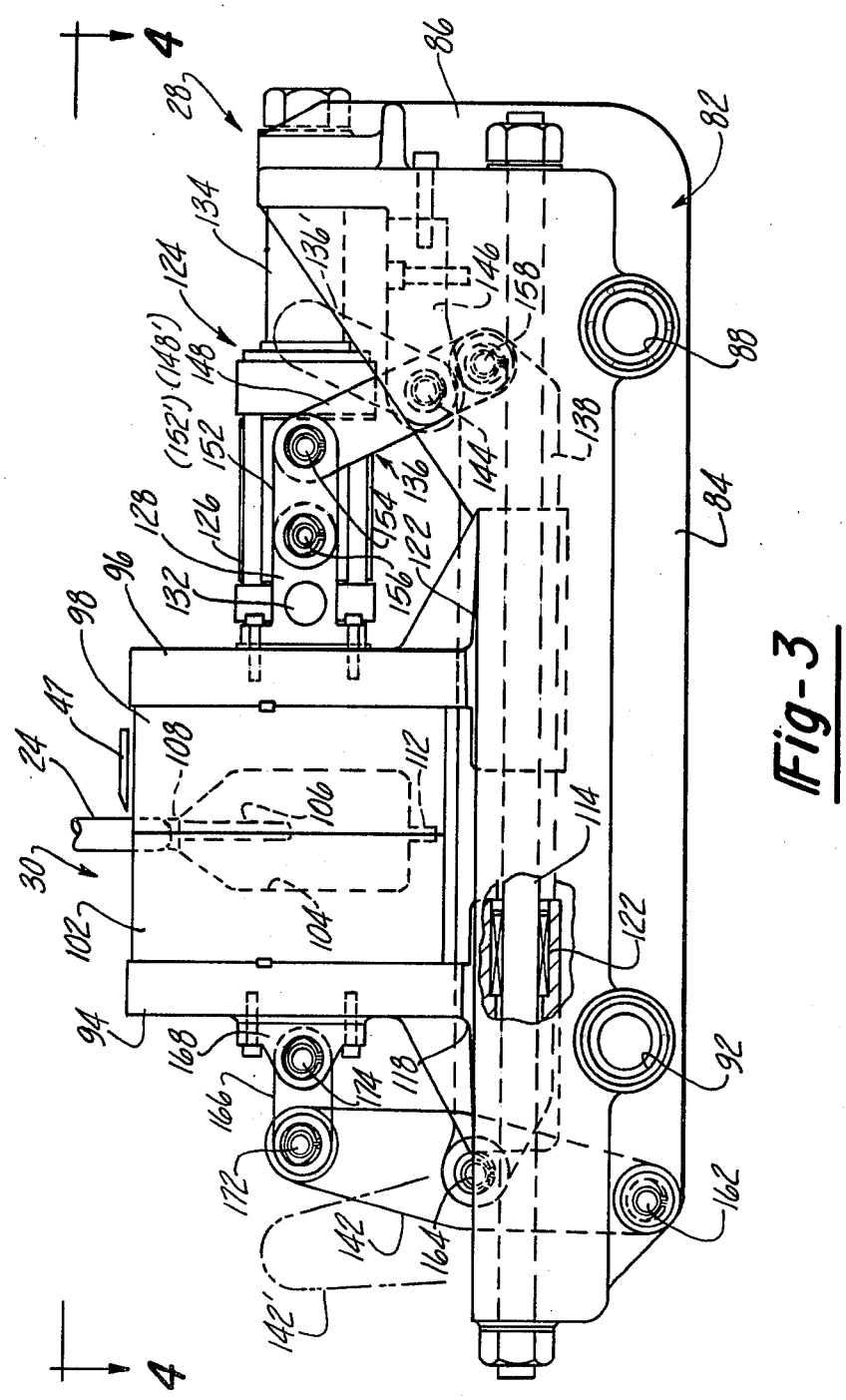
FIG. 3 shows the clamp and is a view taken on line 3—3 of FIG. 2.
Figure 4:
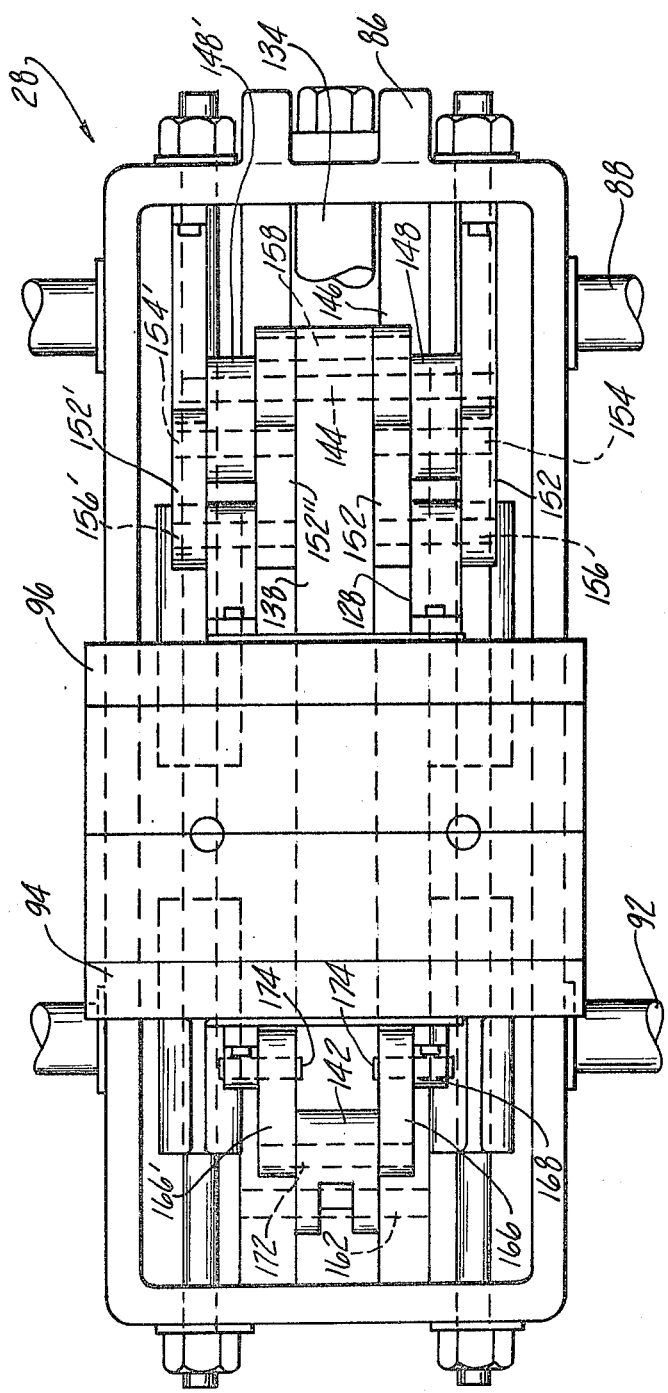
FIG. 4 is a view taken on line 4—4 of FIG. 3.

The clamp 28 will now be described with particular reference to FIGS. 2, 3 and 4. The clamp comprises a cradle or clamp body 82 which is preferably constructed as an elongate member of unitary structure. The body 82 includes a horizontal bed plate 84 and a reaction member in the form of a vertical end or head plate 86 and it includes an end or toe plate 87. The bed plate is fitted with slide bearings 88 and 92 which are supported upon the guide bars 52 and 54, respectively, in the frame 18. This mounting of the body 82 of the clamp 28 permits the clamp to be transferred transversely of the frame 18 between the extruding stations and the blow stations.

The clamp 48 further comprises first and second platens 94 and 96 which extend transversely of the bed plate 84 and which are adapted to carry mold sections 98 and 102, respectively, of the mold 30. As previously noted, the mold 30 defines two mold cavities so that two molded articles may be formed in each cycle of the machine. The first mold cavity 104 is shown in FIG. 3 and is of the configuration of a bottle with an integrally molded handle. As such, the cavity defines a handle portion 106, a neck portion 108 and a tail portion 112. As is well understood in the art, the mold sections 98 and 102 must be closed with great force and accurate alignment during the blow molding operation in order to withstand the high pressure introduced by the blow pin.

In order to provide for opening and closing of the mold sections 98 and 102, the platens 94 and 96 are movably mounted on the clamp body 28. For this purpose, a pair of guide rods 114 and 116 extend from the head plate 86 to the toe plate 87 of the clamp body 28. The platen 94 is provided with a support member 118 which is fitted with a pair of slide bearings 122 which are received on the guide rods 114 and 116, respectively. Similarly, the platen 96 is provided with a support member 122 fitted with a pair of slide bearings which are received on the guide rods 114 and 116, respectively. The guide rods 114 and 116 guide the movement of the platens 94 and 96 along the direction of a clamping axis for the opening and closing motions of the mold sections. The platens 94 and 96 are mechanically coupled to each other and motion is imparted to the platen for opening and closing the mold sections by an actuator in the form of a linear hydraulic motor 124. In particular, the hydraulic motor 124 comprises a cylinder 126 which is connected to the platen 96 by a trunnion 128. The trunnion is mounted on the platen 96 by bolts and the head of the cylinder is mounted on the trunnion by a trunnion pin 132. The piston rod 134 of the hydraulic motor 124 is fixed by a mounting nut to the head plate 86.

To produce equal and opposite motions of the platens 94 and 96, the platens are connected together through a first multiplier lever 136, a pull bar 138 and a second multiplier lever 142. More particularly, the first multiplier lever 136 is a yoke shaped lever which is mounted by a pivot pin 144 on the head plate 86 by means of a support bracket 146. One upper arm 148 of the multiplier lever 136 is connected with one arm of the trunnion 128 by a pair of pivot links 152 and associated pivot pins 154 and 156. Similarly, the other upper arm 148' of the lever 136 is connected with the other arm of the trunnion 128 by a pair of pivot links 152' and associated pivot pins 154' and 156'. The lower arm of the first multiplier lever 136 is bifurcated and connected with the pull bar 138 by a pivot pin 158.

The second multiplier lever 142 is connected at its lower end with the bed plate 84 by a pivot pin 162. The lever 142 is connected intermediate its ends with the pull bar 138 by a pivot pin 164. At its upper end, the lever 142 is connected with the platen 94 through a pivot link 166 and trunnion 168 and associated pivot pins 172 and 174.

The first multiplier lever 136 and the second multiplier lever 142 have lever arms so related as to cause the motion of platen 94 to be equal and opposite to the motion of platen 96. In the illustrative embodiment, the first multiplying lever 136 is a simple lever with the axis of the pivot pin 154 spaced twice as far from the fulcrum axis of pivot pin 144 as the axis of pivot pin 158. Thus, actuation of the hydraulic motor 124 causes the pull bar 138 to move one-half the distance as that imparted to the platen 96. The multiplying lever 142 is a compound lever with the axis of pivot pin 172 and the axis of pivot pin 162 being equally spaced from the fulcrum axis of pivot pin 164. Accordingly, the distance moved by the platen 94 is twice that moved by the pull bar 138 and hence the motion of a platen 94 is equal and opposite to that of platen 98. When the hydraulic motor 124 is energized to extend the piston rod 134, the platens 94 and 96 are moved toward each other to close mold sections 98 and 102. When the motor is energized to retract the piston rod 134 the platens 94 and 96 are moved away from each other to open the mold sections 98 and 102.

Figure 5:
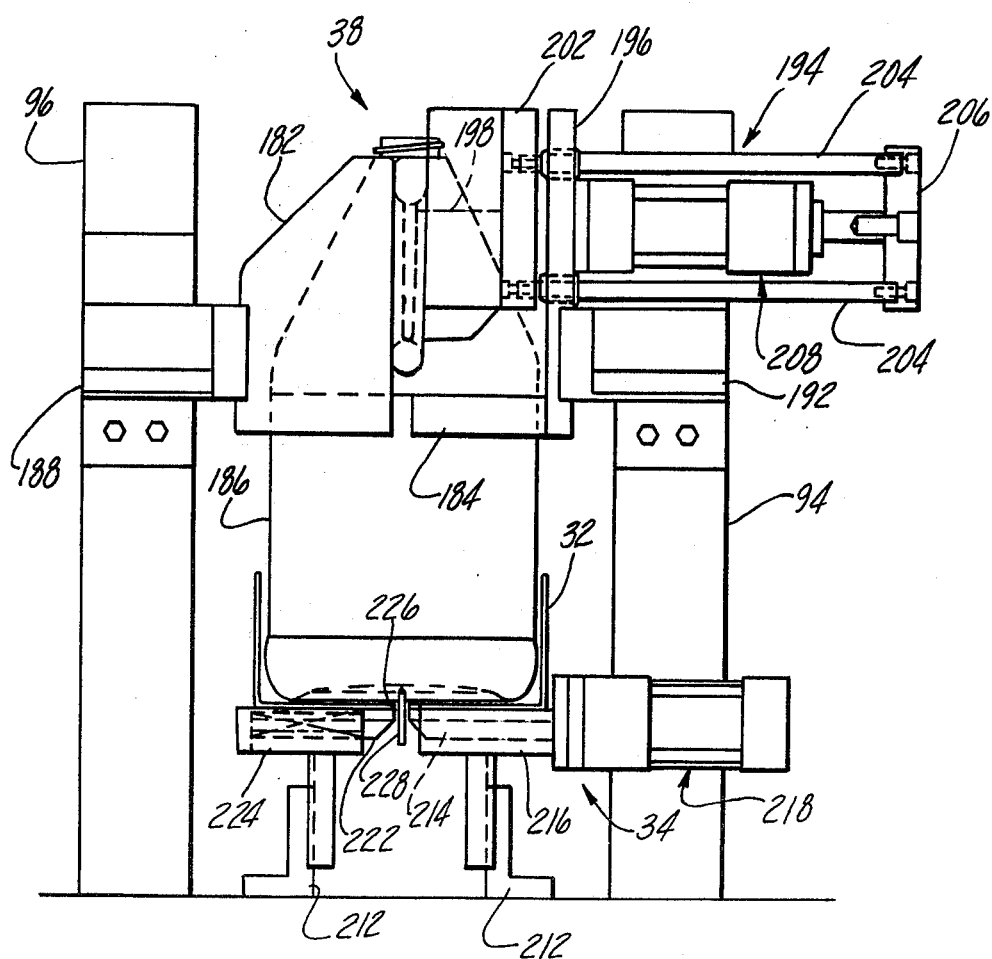
FIG. 5 shows the flash trimming means and is a view taken on line 5—5 of FIG. 2.

The trimming stations comprising trimming punches 34 and 36 at the receiving tray 32 will be described with particular reference to FIGS. 2 and 5. In order to transfer the molded articles to the trimming stations from the blow stations, a transfer carrier 38 is provided. It will be understood that after the tubular parisons in the mold 30 have been expanded at the blow station, the mold sections are opened leaving the formed articles hanging on the respective blow pins 24 and 26. The transfer carrier 38 is adapted to remove the formed articles from the blow pins and carry them to the receiving tray 32. For this purpose, the transfer carrier 38 comprises a first set of retainer members 182 and 184 which are adapted, when in a closed position as shown in FIG. 5, to retain a formed article 186 therebetween for transfer purposes. The retainer member 182 is mounted on an arm 188 (see FIGS. 2 and 5) which extends laterally from the side of the platen 96. The retaining member 184 is similarly mounted on an arm 192 which extends laterally from the side of the platen 94. The first set of retaining members 182 and 184 is adapted to transfer a formed article from the blow pin 24 to the receiver tray 32.

A second set of retainer members, identical to the first set just described, is mounted on the arms 188 and 192 in the same manner as the first set. The second set of retaining members, of which only member 182' is shown, is adapted to transfer a formed article from the blow pin 26 to the tray 32.

For the purpose of trimming the flash at the handle of each formed article, a trimming punch 194 is mounted on the arm 94 opposite the retainer member 182. The trimming punch 194 comprises a mounting plate 196 which is secured to the arm 192. A punch element 198 is mounted on a movable plate 202 which is adapted for reciprocable movement relative to the plate 196. The movable plate 202 is mounted on a set of four rods 204 (only two shown in FIG. 5) which are slidably mounted in bushings in the plate 96. The rods 204 are secured to a cross head 206 for movement in unison. For actuating the punch element 198, a linear pneumatic motor 208 has its cylinder mounted on the plate 196 and its piston rod connected with the cross head 206. When the pneumatic motor 208 is energized, the piston rod is retracted and the punch element is extended with quick motion toward the retaining member 182 to engage the handle flash and break it from the formed article.

Another trimming punch, not shown in the drawings, identical to punch 194, is mounted on the arm 192 at a position opposite the retainer member 184. This punch is adapted to remove the handle flash from the formed article held by the retainer member 184.

The receiving tray 32 is adapted to receive the two formed articles which are transferred from the blow stations to the trimming stations by the transfer carrier 38. The receiving tray 32 is mounted by a bracket 212 on the end plate 44 of the lifting frame 18. Accordingly, the receiving tray 32 is movable with the lifting frame 18. The trimming punches 34 and 36 are mounted on the bracket 212. The trimming punch 34, as shown in FIG. 5, comprises a punch element 214 which is slidably mounted in a support plate 216. The punch element 214 is actuated by a linear pneumatic motor 218. A reaction element 222 is slidably mounted and spring loaded in a support plate 224 in opposition to the punch element 214. The receiving tray 32 is provided with an axially extending slot 226 to receive the tail flash 228 on the formed article 186. The support plates 216 and 224 are positioned relative to the tray 32 so that the punch element 214 and reaction element 222 are on opposite sides of the tail flash 228. When the motor 218 is energized, the punch element 214 is extended with quick motion and displaces the tail flash toward the reaction element 222 and breaks the tail flash off the article.

The trimming punch 36 is identical to the trimming punch 34 and is positioned on the receiving tray 32 for removal of the tail flash from the formed article transferred to the trimming station by the second set of retainer members.

In operation of the blow molding machine, the extruder heads 14 and 16 continuously extrude hollow parisons 42 and 43, respectively. A cycle of machine operation may be considered to start with the clamp 28 at the extruding stations with the lifting frame 18 in its upper or raised position, as shown in FIG. 2. With the clamp 28 open, i.e. the hydraulic motor 124 retracted, and the multiplying lever 136 is in the position shown by phantom line 136' and the multiplying lever 142 is in the position shown by phantom line 142'. Accordingly, the mold sections 98 and 102 are open and the parisons 42 and 43 enter the respective mold cavities.

When the parisons 42 and 43 reach a predetermined length, the hydraulic motor 124 is energized to close the clamp 28 and the mold sections 98 and 102 are closed thereby in proper alignment and with sufficient force to withstand the molding pressures to be introduced. The parisons 42 and 43 are severed by actuation of the respective knives 45 and 47 and substantially simultaneously, the hydraulic motors 74 and 76 are de-energized to allow the lifting frame 18 to drop the clamp 28 by a quick motion to its lower position. In this position, the clamp is moved on the clamp guides 52 and 54 from the extruding stations to the blow stations wherein the openings in the respective mold cavities are aligned with the blow pins 24 and 26. The blow pins are extended downwardly, by means not shown, to enter the openings of the mold cavity and pressurized air is supplied through the blow pins to expand the parisons against the walls of the mold cavities. During this blowing operation, the hydraulic motors 74 and 76 are energized to raise the lifting frame and the clamp 28 to the upper position. It is noted that the bridge 78 which supports the blow pins 24 and 26 is also mounted on the lifting frame 18 and hence the blow pins move upwardly with the clamp 28. When the blowing operation is completed, the clamp 28 is opened to retract the mold sections from the molded articles and the clamp is returned from the blow stations to the extruding stations in the open position.

When the clamp is returned to the extruding stations in the open condition it is in readiness for the start of a new cycle. It is noted however, that the molded articles were left hanging on the blow pins 24 and 26 when the mold was opened at the blow stations. It remains, therefore, to transfer the articles from the blow stations to the trimming stations and to perform the trimming operation. When the clamp 28 is closed, at the start of the second machine cycle, the retaining members of the transfer means 38 are closed to engage the respective formed articles on the blow pins 24 and 26. The blow pins are retracted and, when the clamp 28 is moved from the extruding stations to the blow stations, the transfer means 38 is moved therewith so that the molded articles are positioned on the receiving tray 32. During the interval when the parisons in the mold are being blown, the formed articles on the receiving tray 32 are trimmed by actuation of the pneumatic motors of the trimming punches 194 and the pneumatic motors 218 of the trimming punches 34. When the clamp is opened at the blow stations, the retaining members of the transfer means 38 are also opened to release the blown articles at the receiving tray. When the clamp is moved back to the extruding stations in readiness for the next machine cycle, the transfer means 38 is moved therewith to the blow stations in readiness for the transfer operation of the next cycle.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. In a blow molding machine of the type comprising:
at least one work station adapted to support a workpiece,
first and second platens adapted to carry first and second mold sections, respectively,
and a clamp supporting the platens for movement along a clamping axis to close and open the mold sections with respect to the workpiece,
the improvement wherein said clamp comprises:
an elongate body extending in the direction of said clamping axis,
actuating means disposed between said body and said first platen for moving said first platen along said clamping axis,
a first lever being pivotally coupled with said body and with said first platen,
a second lever being pivotally coupled with said body and with said second platen,
and a pull bar being pivotally coupled with said first lever and said second lever,
pivotal couplings on said levers being spaced so that movement of said first platen along said clamping axis imparts equal and opposite movement to said second platen.

2. The invention as defined in claim 1 wherein,
said body includes a reaction member extending transversely of the clamping axis,
and said actuating means comprises a hydraulic motor extending between said reaction member and said first platen.

3. The invention as defined in claim 1 wherein,
said body includes platen guide means extending in the direction of said clamping axis,
said first and second platens being slidably mounted on said guide means for movement between unclamping and clamping positions corresponding to open and closed positions of said mold sections.

4. The invention as defined in claim 1 including,
a machine base,
plural work stations supported on said base and including an extruding station and a blow station disposed on a line extending transversely of said clamping axis,
clamp guide means supported by said base and extending transversely of said clamping axis,
said body being slidably mounted on said clamp guide means for movement of said mold sections between the extruding station and the blow station.

5. In a blow molding machine of the type comprising:
a machine base,
an extruder mounted on said base at an extruding station,
lifting means mounted on said base below said extruder for limited vertical movement between upper and lower positions,
a bridge mounted on the lifting means and movable therewith,
a blow pin mounted on said bridge above said lifting means at a blow station,
clamp guide means on said lifting means,
a clamp mounted on said clamp guide means for movement between the extruding station and the blow station,
said clamp being adapted to carry a pair of mold sections and to move the mold sections along a clamping axis between open and closed positions,
said extruder being adapted to continuously extrude a parison, said clamp being moved to its closed position at the extruding station to close the mold sections over said parison, said parison being severed and said clamp being lowered at the extruding station by said lifting means and moved to the blow station for expansion of said parison by said blow pin to form an article, said clamp being raised at the blow station by said lifting means and the mold sections being opened by the clamp for return movement to the extruding station,
the improvement wherein:
said clamp comprises an elongate body extending in the direction of a clamping axis and movably mounted on said guide means, said body including a reaction member extending transversely of the clamping axis, first and second platens adapted to carry the first and second mold sections, respectively, a hydraulic motor extending between said reaction member and said first platen, a first lever having a pivotal coupling with said reaction member and a pivotal coupling with said first platen, a second lever having a pivotal coupling with said body and a pivotal coupling with said second platen, and a pull bar having a pivotal coupling with said first lever and said second lever, said pivotal couplings being spaced on said levers so that movement of said first platen along said clamping axis imparts equal and opposite movement to said second platen.

6. The invention as defined in claim 5 wherein said lifting means comprises, a lifting frame, a hydraulic motor connected between said machine base and said frame, a first pair of pivot links connected separately between said base and spaced points on said frame, a first shaft connected between the first pair of pivot links, a second pair of pivot links connected separately between said base and spaced points on said frame, a second shaft connected between the second pair of pivot links, first and second crank arms rigidly connected to the first and second shafts, respectively, and a tie rod connected between said crank arms, whereby all of said points on said frame are caused to move in unison when said hydraulic motor is actuated.

7. The invention as defined in claim 5 including, a pair of carrier members adapted when closed to support said article therebetween, said carrier members being disposed in opposition to each other and mounted respectively on said platens laterally of said mold sections for opening and closing movement with the mold sections, a trim station supported on said machine base and disposed laterally of said blow station, first flash removal means mounted on one of said carrier members and adapted to remove the flash on one portion of said article, a receiving tray at said trim station and adapted to receive said article, and second flash removal means supported by said base at said trim station and adapted to remove the flash from another portion of said article.

8. The invention as defined in claim 5 wherein said body comprises a unitary box-like member having a pair of side walls and a pair of end walls, said clamp guide means comprising a pair of guide rods extending between said end walls, said reaction member comprising a first end wall, said first lever having a pivotal coupling with said first platen at one end of the first lever, a pivotal coupling with said pull bar at the other end of said first lever and a pivotal coupling with said reaction member at an intermediate point on said first lever, said second lever having a pivotal coupling with said second platen at one end of the second lever, a pivotal coupling with said body at the other end of said pivotal lever, and a pivotal coupling with said pull bar at an intermediate point on said second lever.

9. The invention as defined in claim 8 wherein, said pull bar extends below said platens and is disposed substantially within the confines of said side walls, said pull bar being in tension and said side walls being in compression.

10. In a blow molding machine of the type comprising:

a machine base, an extruder mounted on said base at an extruding station, lifting means mounted on said base below said extruder for limited vertical movement between upper and lower positions, a bridge mounted on the lifting means and movable therewith, a blow pin mounted on said bridge above said lifting means at a blow station, clamp guide means on said table, a clamp mounted on said clamp guide means for movement between the extruding station and the blow station, said clamp being adapted to carry a pair of mold sections and to move the mold sections along a clamping axis between open and closed positions, said extruder being adapted to continuously extrude a parison, said clamp being moved to its closed position at the extruding station to close the mold sections over said parison, said parison being severed and said clamp being lowered by said lifting means at the extruding station and moved to the blow station for expansion of said parison by said blow pin to form an article, said clamp being raised by said lifting means at the blow station and the mold sections being opened by the clamp for return movement to the extruding station, the improvement wherein said lifting means comprises:

a lifting frame, a hydraulic motor connected between said machine base and said frame, a first pair of pivot links connected separately between said base and spaced points on said frame, a first shaft connected between the first pair of pivot links, a second pair of pivot links connected separately between said base and spaced points on said frame, a second shaft connected between the second pair of pivot links, first and second crank arms rigidly connected to the first and second shafts respectively, and a tie rod connected between said crank arms, whereby all of said points on said frame are caused to move in unison when said hydraulic motor is actuated.

* * * * *